Figure 2:
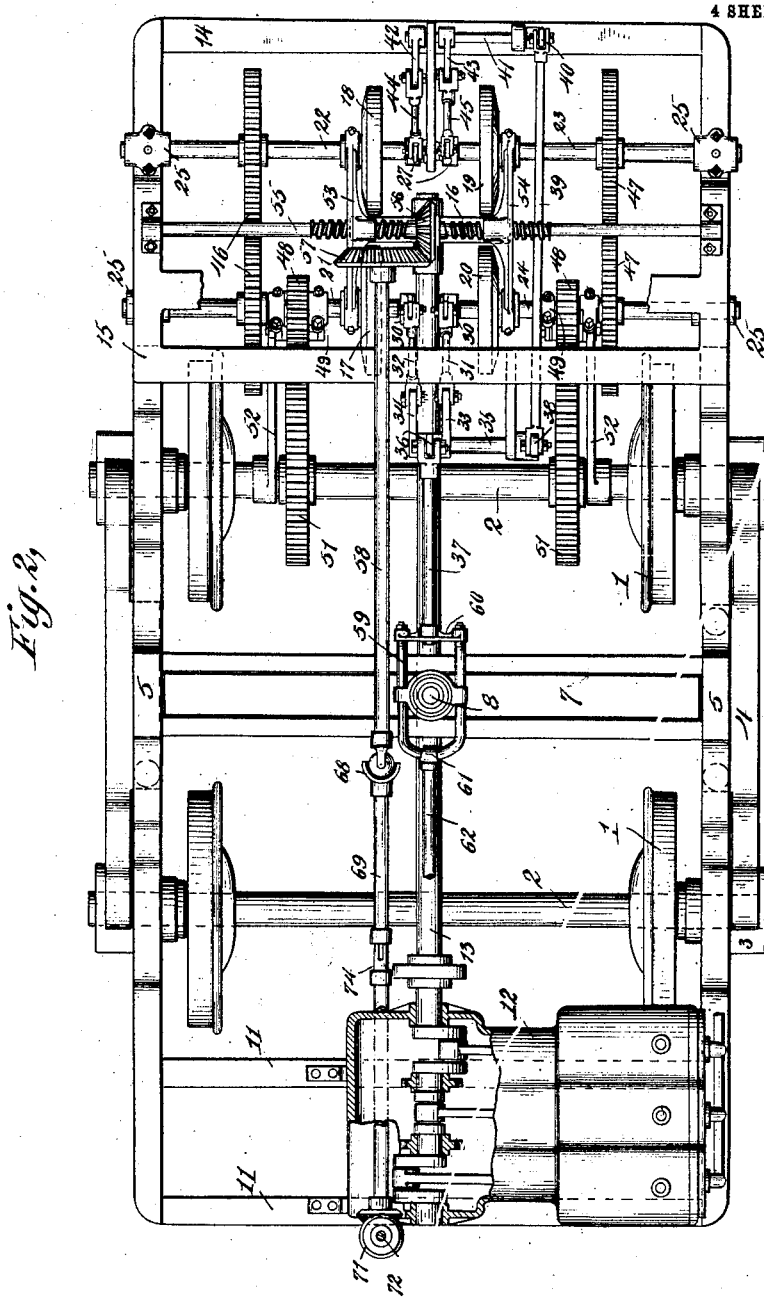

No. 838,112. PATENTED DEC. 11, 1906.
W. D. HAWK.
MOTOR VEHICLE.
APPLICATION FILED JAN. 20, 1906.
4 SHEETS—SHEET 1.
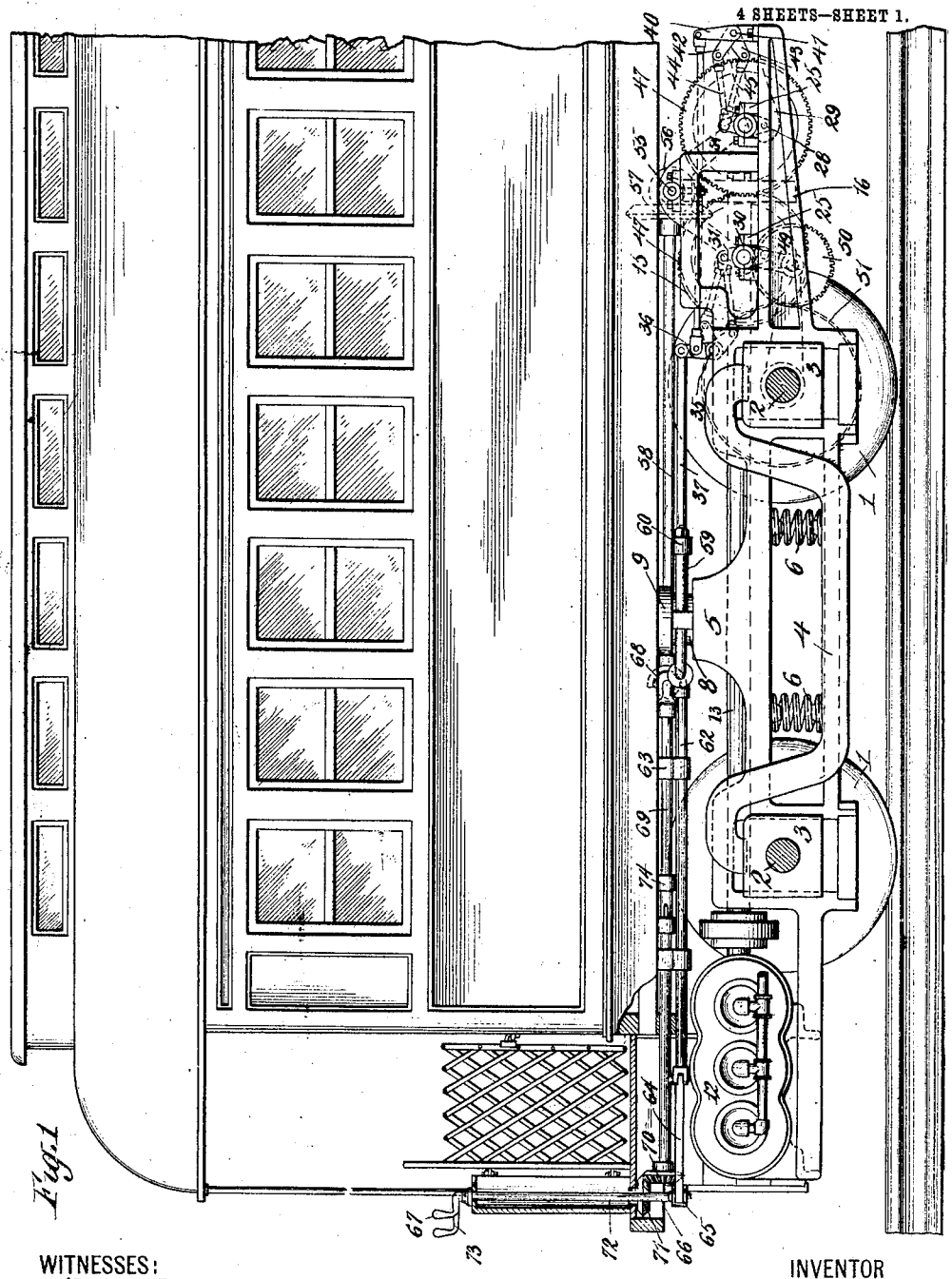
Fig.1
WITNESSES:
INVENTOR
BY
ATTORNEY No. 838,112. PATENTED DEC. 11, 1906.
W. D. HAWK.
MOTOR VEHICLE.
APPLICATION FILED JAN. 20, 1906.

4 SHEETS—SHEET 2.

WITNESSES:

INVENTOR
Walter D. Hawk
BY
ATTORNEY

No. 838,112. PATENTED DEC. 11, 1906.
W. D. HAWK.
MOTOR VEHICLE.
APPLICATION FILED JAN. 20, 1906.

4 SHEETS—SHEET 3.

WITNESSES:

INVENTOR
W. D. Hawk
BY
ATTORNEY

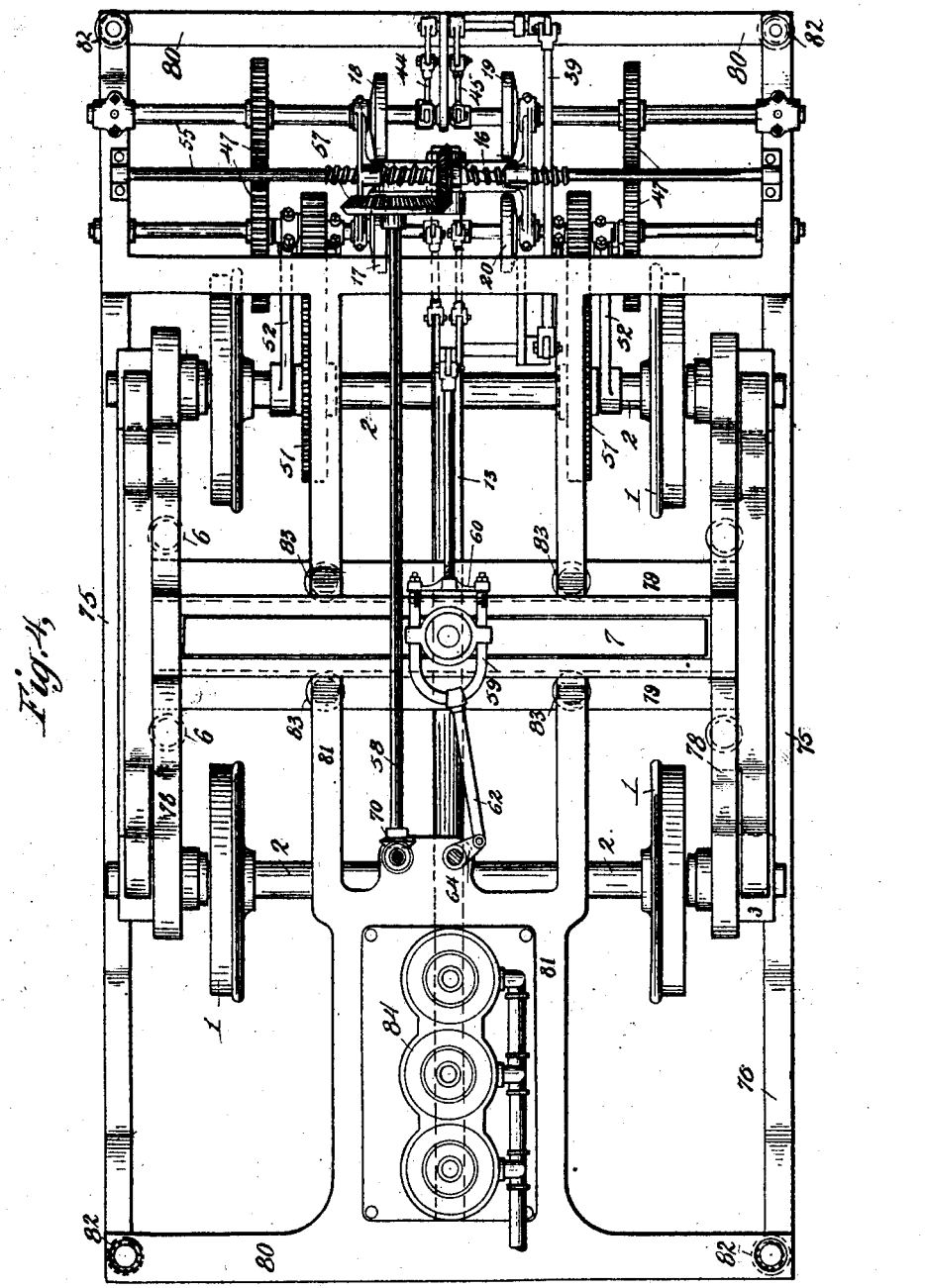

UNITED STATES PATENT OFFICE.

WALTER D. HAWK, OF CHICAGO, ILLINOIS.

MOTOR-VEHICLE.

No. 838,112.     Specification of Letters Patent.     Patented Dec. 11, 1906.

Application filed January 20, 1906. Serial No. 297,006.

To all whom it may concern:

Be it known that I, WALTER D. HAWK, a citizen of the United States, residing at Chicago, in the county of Cook and State of Illinois, have invented certain new and useful Improvements in Motor-Vehicles, of which the following is a specification.

This invention relates to motor-vehicles, and more particularly to self-propelled cars of larger size than the automobiles now in common use and which on account of their greater size make it desirable, if not necessary, to pivot the trucks to the car-body.

The principles of my invention, though not restricted as to use, are specially applicable to light self-propelled passenger railway-cars.

My invention contemplates the provision of a truck arranged for pivotal connection to a car-body and carrying a gas-engine and a control system by which the application of the power of the engine to the wheels of the truck may, if desired, be controlled from the car-body. The truck carries, in addition to the engine, all the accessories therefor and a suitable transmission mechanism, and it is therefore a self-contained motor-truck, which may with little delay be substituted for a truck not provided with an engine to make the vehicle self-propelling.

One feature of my invention consists in so supporting the engine on the truck as to free it from shocks and jars when the car is in motion. This is accomplished by the introduction of springs between the engine and the axles and the provision of gearing arranged to maintain the engine in driving relation to the axle, even though it is independently movable through the flexure of its supporting-springs. Supporting the engine on the axles yieldingly is considered of great importance, since if it were rigidly supported, as has been heretofore proposed, the continual jarring to which the wheels are subjected would all be transmitted to the engine, and the latter would have to be stronger and heavier, and hence more costly, and even then would not be reliable in operation. The spring-supports for the engine may be arranged in any suitable manner.

In trucks as heretofore constructed it has been common to provide springs between the axles and a bolster on which the car-body is pivoted. I may adopt this construction by mounting the engine on a frame, secured to and moving with this spring-supported bolster, and the engine may be connected to the driving-axle by an intermediate gear maintained in mesh with a gear driven by the engine and one on the axle by links which hold it always in the proper relation for transmitting power.

In some cases I prefer to yieldingly support the engine and its accessories on the truck-wheels independently of the car-body, which is also yieldingly supported. This is particularly desirable for such uses as on vehicles whose load varies between unusually-wide limits, for the reason that when such vehicles are heavily loaded the springs supporting the car-body are compressed to such a degree that they afford little resiliency, and if the engine were carried by the same supports as the car-body it would be subjected to the same jarring as when rigidly supported. In such cases I may employ an auxiliary body supported by springs on the truck-wheels and movable independently of the car-body and the spring-supported bolster on which it rests. With this construction the load on the springs for the driving-engine is constant, and the strength of these springs can therefore be calculated for the load which they are to carry, or I may yieldingly support the engine upon the frame which carries the car-body and which is spring-supported on the wheels, so that the engine receives the benefit of two sets of springs.

The power of the engine-shaft is transmitted to the driving axle or axles by a suitable transmission mechanism which may be arranged for changing the speed and reversing the direction of the rotation of the driven axle relatively to the engine-shaft. Preferably I employ a frictional transmission mechanism, such as that shown in my application for Letters Patent filed October 30, 1905, and serially numbered 285,075. I also provide mechanically-operated devices for actuating the parts of such transmission mechanism from the car-body to which the truck is pivoted. These consist of lever systems so arranged as to be entirely unaffected by the movement of the truck relatively to the car-body about the axis of the king-pin.

I have illustrated embodiments of my invention in the accompanying drawings, in which—

Figure 3:
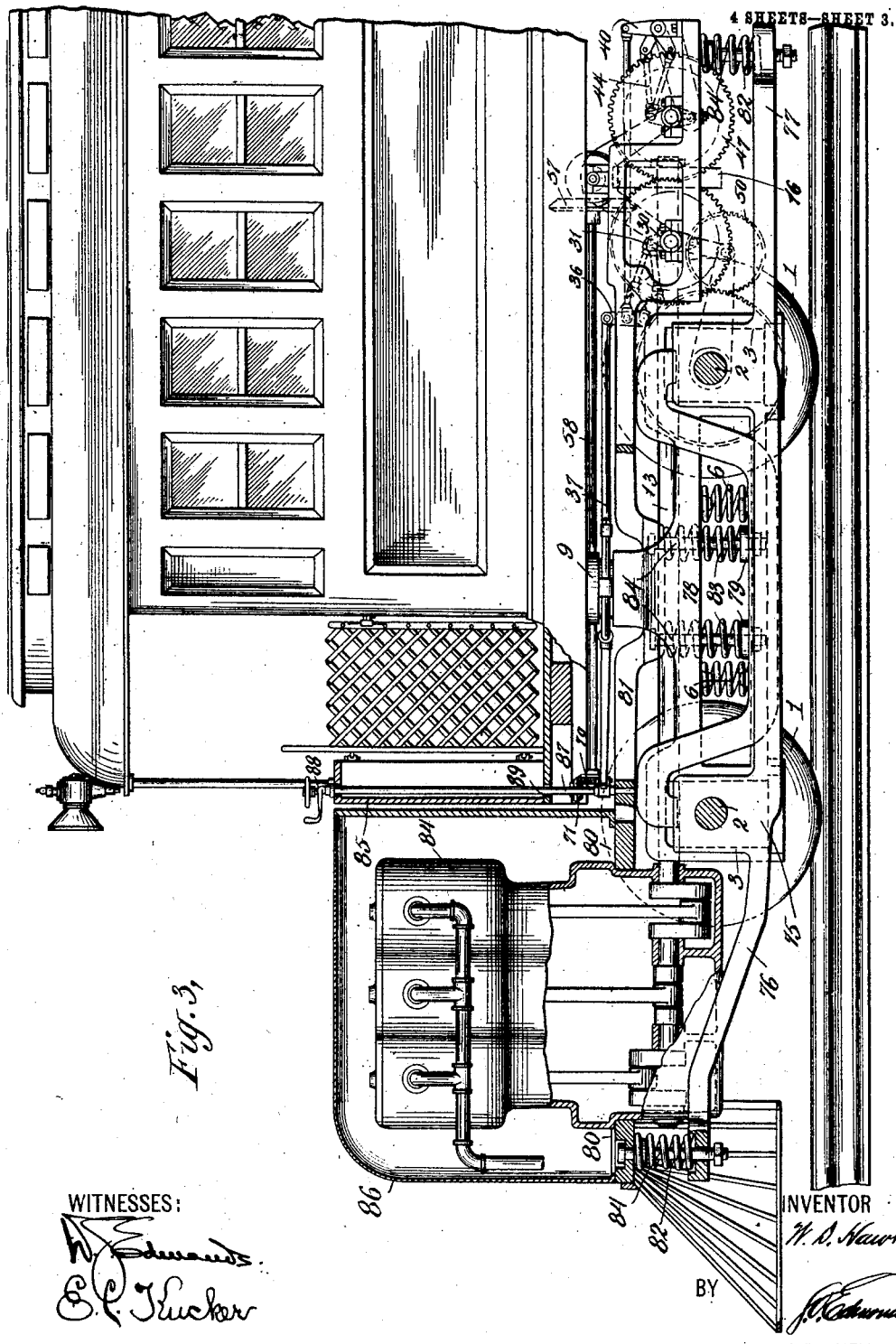

Figure 1 is an elevation of the end of a car. Fig. 2 is a plan view of the truck, and Figs. 3 and 4 are similar views showing a modification.

Referring first to Figs. 1 and 2, 1 indicates the wheels of a bogie-truck secured on axles 2, which are rotatable in bearings in the journal-boxes 3. At each side of the truck is a beam 4, secured at its ends to or formed integral with the journal-boxes 3 and bent to form a depressed portion intermediate of its ends.

5 5 indicate the side members of a frame which is yieldingly supported upon the beams 4 4. These side members have ways formed therein in which the journal-boxes 3 are adapted to reciprocate vertically and are extended at each end beyond these ways. They are supported on the upper ends of heavy coiled springs 6, which at their lower ends rest on parts projecting inwardly from the beams 4. Extending across between the side members 5 at about the middle and secured thereto is a bolster 7, in which is a socket 8 to receive the king-pin carried by a support 9, secured on the bottom of the car-body, and thus pivot the truck to the car. At one end the side members 5 are connected by cross-beams 11, on which is secured an engine 12. This is preferably a multicylinder gas-engine of the usual construction, having its pistons connected by the usual connecting-rods and cranks to the engine-shaft 13. This shaft extends back to the other end of the truck to the transmission mechanism, which is carried on a cross-beam 14 and an auxiliary frame 15. This transmission mechanism preferably consists of a friction-disk 16, keyed or splined on the engine-shaft 13, and two pairs of friction-rollers 17 and 18 and 19 and 20 mounted on opposite sides of the disk-axis, the rollers of each pair being on opposite sides of the disk. Either pair of rollers may be brought into engagement with the disk 16 to engage the disk between them, and thus transmit rotary motion from the engine-shaft 13 to the shafts carrying the friction-rollers. The friction-rollers 17, 18, 19, and 20 are splined on shafts 21, 22, 23, and 24, respectively, and each of these shafts is supported at one end in a bearing 25, which is pivoted on a vertical axis on one of the side members 5. At their adjacent ends shafts 22 and 23 are supported in bearings 27, having projections on their upper and lower sides with openings therethrough, and a bolt 28 extends through the openings in the downwardly-extending projections and also through an opening in an arm 29, secured on the cross-beams 14, so that the bearings 27 are pivotally supported in the bolt 28. The adjacent ends of shafts 21 and 24 are similarly supported in bearings 30, pivotally mounted on a bolt carried by an arm depending from the framework. The upwardly-extending projections on bearings 30 are connected by links 31 and 32 with cranks 33 and 34, respectively, secured on a shaft 35 and extending one above and the other below the horizontal. Shaft 35 is rotatable in bearings depending from the auxiliary frame 15 and carries a third crank 36, to which is pivotally connected a rod 37. On shaft 35 is another crank 38, and a rod 39 is pivotally connected at one end to crank 38 and at the other to a crank 40, secured on a shaft 41, mounted in bearings on the cross-beam 14 and carrying cranks 42 and 43, which extend one above and the other below the horizontal and which are connected by links 44 and 45, respectively, to the upwardly-extending projections on the bearings 27 for the shafts 22 and 23. It will be seen that this construction is such that movement of rod 37 rocks shafts 35 and 41, and that such movement in one direction will turn the bearings 27 and 30 for shafts 21 and 22 about their pivots to carry the friction-rollers 17 and 18 on those shafts into engagement with the friction-disk 16 and that movement in the opposite direction will act similarly to move rollers 19 and 20 into engagement with the disk 16, the vertical pivots of the outer ends of the shafts 21, 22, 23, and 24 permitting such movement. On shafts 21 and 22 are intermeshing gears 46 and on shafts 23 and 24 similar gears 47. As the friction-rollers of a pair are moved into engagement with the disk 16 they squeeze the disk between them, and rotary motion is thus transmitted to the shafts on which these rollers are splined, and the gears 46 and 47 transmit the power of one shaft to the other shaft of that pair. Also as the two pairs of rollers are mounted on opposite sides of the axis of disk 16 shafts 21 and 24 will be driven in opposite directions.

On shafts 21 and 24 are pinions 48, and loosely mounted on these shafts are links 49, which at their lower ends support short shafts on which gears 50 are mounted in mesh with pinions 48. Secured on the driving-axle 2 of the truck are gears 51, and loose on this axle are links 52, which at their outer ends are provided with bearings for the shafts of the gears 50, and which hold gears 50 in mesh with gears 51. Links 49 and 52 being pivoted concentric with pinions 48 and gears 51, respectively, hold the intermediate gears 50 in mesh with the pinions 48 and gears 51 in all positions of the supporting-frame and parts carried thereby relatively to the wheels 1 and axles 2.

On one side of each of the friction-rollers 17, 18, 19, and 20 is a hub having a peripheral groove therein, and yokes 53 and 54 have arms which extend into the grooves in the rollers of a pair. Mounted on bearings on the auxiliary frame 15 is a shaft 55, having reverse threads thereon and extending through threaded openings in the yokes 53 and 54. At the center of shaft 55 a bevel-gear 56 is secured thereon with which meshes a similar gear 57, secured on a shaft 58. These devices are so arranged that turning shaft 58 turns shaft 55 and thus moves yokes 53 and 54 and the pairs of friction-rollers to which they are connected and which are splined on their supporting-shafts toward and away from the axis of the disk 16, so as to vary the speed of rotation of the rollers when in contact with the disk, as will be well understood.

The mechanism for operating the rod 37 and shaft 58 from the car-body will now be described. The socket 8 for the king-pin has projections at its sides having openings therethrough, and the side members of a yoke 59 are adapted to slide in these openings. At one end these side members are connected by a cross-head 60, to which the rod 37 is connected. At the other end the yoke is bent to the arc of a circle concentric with socket 8 when the yoke is in the intermediate position, and mounted to slide on this curved portion is a sleeve 61, to which a rod 62 is connected. Rod 62 passes through suitable guides 63 on the bottom of the car-body and at its end is pivotally connected to a connecting-rod 64, whose other end is pivoted to a crank 65, carried by a shaft 66, extending upward to a position convenient for the operator—as, for instance, at the front of the car-platform—and provided with an operating-handle 67. Shaft 58 is connected to one member of a universal joint 68, located as near the socket 8 as the parts of the trunk will permit, and the other member of this joint is connected to a shaft 69, which at its other end carries a bevel-gear 70, meshing with a gear 71 on a shaft 72, extending upward adjacent to shaft 66 and provided at its upper end with an operating-handle 73. In the shaft 69 is a spline 74, permitting the two sections of the rod to telescope slightly.

The operation of the mechanism will be understood from the foregoing description. The engine and transmission mechanism are supported on the frame consisting of the side members 5 and the cross-beams connecting them and which is supported by the springs 6 upon the side beams 4. In addition to the coil-springs 6 elliptic springs may be provided between the beams 4 and either the side members 5 of the frame or the bolster 7, as is usual in the construction of trucks. The frame and parts thereon can therefore move vertically independently of the axles 2, but the engine 12 is always in driving relation to the axles irrespective of such movement, as the intermediate gears 50 are held in mesh at all times with both the pinions 48 and gears 51 by the links 49 and 52. The spring 6 therefor absorb the vibration, and the parts of the engine and transmission are relieved from the jarring to which they would be subjected were they not so yieldingly supported and which would cause breakage or faulty operation within a comparatively short time. With the engine running and the parts of the transmission in the positions indicated in Fig. 2 the operator turns handle 67 to start the car. Such movement draws rod 62 axially in its guides, thus moving yoke 59 through the openings in the projections at the sides of the socket 8 and drawing rod 37 axially. This turns shafts 35 and 41 in their bearings and brings one of the two pairs of friction-rollers into engagement with the disk 16, and as the shafts of these two rollers are geared together their combined power is transmitted by the pinion 48 and gears 50 and 51 to the driving-axle of the truck. Movement of rods 62 and 37 and yoke 59 in the opposite direction by handle 67 brings the other pair of friction-rollers into engagement with disk 16 and, as will be evident, the driven axle will rotate in the opposite direction. This mechanism is unaffected by the turning of the truck on its pivot, as the sleeve 61, to which rod 62 is connected, moves around the curved end of yoke 59, and this curved portion is concentric with the axis about which the truck turns. To regulate the speed of the car, the operator turns handle 73, thus rotating shafts 72, 69, and 58 and moving the yokes 53 and 54 toward or away from each other, depending on the direction of movement of the handle. Each of the yokes when thus moved moves a pair of the friction-rollers radially with respect to the disk 16, and the speed at which the disk drives the rollers is thus changed. This mechanism is also unaffected by the turning of the truck relatively to the car-body, as the shafts 69 and 58 are connected by the universal joint 68. This joint is located as close to the pivot of the truck as the parts will permit, and the slight movement due to the displacement of the joint from the axis on which the truck turns is taken up by the spline 74.

In the embodiment of my invention described above with reference to Figs. 1 and 2 it will be noticed that a single set of springs support both the car-body and the engine and transmission. In some cases it is highly desirable to have spring-supports for the engine and transmission separate and distinct from or in addition to those for the car-body, so that the engine can move independently of the car-body and be freed to a very large extent from jarring and vibration when the car-body is so loaded that its springs furnish little resiliency. Such a construction is illustrated in Figs. 3 and 4, in which is shown an auxiliary body carrying the engine and transmission and supported by springs upon the axles of the truck and another set of springs supporting the bolster on which the end of the car-body rests. Except for the provision of this independent spring-supported auxiliary body this form of my invention may be similar in all respects to that shown in Figs. 1 and 2; but in order to show a modification of the design of the parts I have illustrated the truck as pivoted to the car-body nearer the forward end thereof and the engine as vertically disposed with the cylinders extending up in front of the dashboard. In these drawings, 1 1 indicate the wheels carried by axles 2, mounted for rotation in journal-boxes 3, as before. The side beams 75, secured to or formed integral with the journal-boxes, are similar to those of Figs. 1 and 2 except that they are extended at both ends to form the arms 76 and 77. The side frames 78 have guideways formed therein in which the journal-boxes are movable vertically, and springs 6 support these frames on the beams 75. Secured on frame 78 is the bolster which supports the car-body. Extending across between the depressed portions of the beams 75 intermediate the wheels are two sills 79. Spring-supported upon the beams 75 and sills 79 is an auxiliary body consisting of end members 80 and longitudinal members 81, the latter having depressed portions, as shown in Fig. 3, where they pass under the bolster. Four spiral springs 82 support the end members 80 on the ends of the side beams 75 and four spiral springs 83 support the longitudinal members 81 on the sills 79. Preferably bolts 84 extend through these springs and the parts engaged thereby and are headed at both ends to limit the upward movement of the auxiliary body when raised by its supporting-springs. The engine 84' is mounted on the auxiliary body at its forward end and the transmission mechanism at its rear end, the connecting mechanism between the engine and the driving-axle being similar to that described in connection with Figs. 1 and 2. In this instance the engine is arranged vertically, the cylinder extending upward in front of the dashboard 85 and being provided with a hood 86. Instead of the control system of Figs. 1 and 2 the shafts 87 and 88, controlling the transmission mechanism, may be mounted in bearings carried by the intermediate body and may extend upward through an arc-shaped slot 89 in the platform of the car-body. As the pivot of the truck is so close to the forward end of the car, the movement of shafts 87 and 88 when the car runs onto or off of a curve is very slight. It will be seen that with this construction the springs 82 and 83 furnish a yielding support for the auxiliary body which carries the engine and transmission mechanism and that the car-body is yieldingly supported by the springs 6 independently of the auxiliary body. The engine can therefore move vertically independently of the car-body, the driving relation of the engine to the truck-axle being always maintained. Also it will be seen that this same result can be obtained by supporting the auxiliary body by means of the springs 83 upon the side frames 78, which are spring-supported upon the wheels, in which case both sets of springs 6 and 83 would serve to relieve the engine from jarring.

I claim—

1. In a motor-vehicle, the combination of a car-body, a truck comprising axles and wheels and a frame supported thereby pivotally connected to the car-body, a gas-engine, springs yieldingly supporting the gas-engine upon the truck below the car-body and permitting the entire engine to move vertically independently of the truck, and means connecting the gas-engine in driving relation to a wheel of the truck, substantially as described.

2. In a motor-vehicle, the combination of a car-body, a truck comprising axles and wheels and a frame supported thereby pivotally connected to the car-body, a gas-engine, springs yieldingly supporting the gas-engine upon the truck and permitting the entire engine to move vertically independently of the truck, and means connecting the engine in driving relation to the truck including a pinion held in mesh with a gear driven by the engine and a gear on an axle of the truck, substantially as described.

3. In a motor-vehicle, the combination of a car-body, a truck having axles and wheels pivotally connected to the car-body, an engine and a speed-varying and reversing mechanism mounted on the truck, springs supporting the engine and said mechanism and permitting them to move relatively to the axles of the truck, connections between said mechanism and an axle of the truck, and means for actuating the parts of said mechanism from the car-body, substantially as described.

4. In a motor-vehicle, the combination of a car-body, a truck having axles and wheels pivotally connected to the car-body, an engine and a frictional transmission mechanism mounted on the truck, springs supporting the engine and said mechanism and permitting them to move relatively to the axles of the truck, and means connecting said mechanism to an axle of the truck, said frictional transmission mechanism being arranged to connect the engine in driving relation to and disconnect it from one of the shafts of the truck and to vary the speed and reverse the direction in which the engine drives the truck, and means for actuating the parts of said mechanism from the car-body, substantially as described.

5. In a motor-vehicle, the combination of a car-body, a truck having axles and wheels pivotally connected to the car-body, an engine and a transmission mechanism mounted on the truck, springs supporting the engine and said mechanism and permitting movement thereof relatively to the axles of the truck, and means connecting the engine in driving relation to the truck throughout the relative movements thereof including a pinion and means for holding the same in mesh with gears on an axle of the truck and a shaft of said transmission mechanism, substantially as described.

6. In a motor-vehicle, the combination of a car-body, a truck comprising axles and wheels and a frame supported thereby pivotally connected to the car-body, an engine, springs yieldingly supporting the engine upon the truck, and mechanical devices actuated from the car-body at a point distant from the pivotal axis of the truck for controlling the connection of said engine in driving relation to a wheel of the truck and arranged to permit movement of the truck relatively to the car-body, substantially as described.

7. In a motor-vehicle, the combination of a car-body, a truck comprising axles and wheels and a frame supported thereby pivotally connected to the car-body, an engine carried by the truck and adapted to be connected in driving relation to a wheel of the truck, and means for yieldingly supporting said car-body and said engine upon said truck one independently of the other, substantially as described.

8. In a motor-vehicle, the combination of a car-body, a truck comprising axles and wheels and a frame supported thereby pivotally connected to the car-body, means for yieldingly supporting the car-body relatively to the wheels of the truck, an auxiliary body yieldingly supported upon the truck and movable relatively to the truck and car-body, an engine carried by said body, and means for connecting the engine in driving relation to a wheel of the truck, substantially as described.

9. In a motor-vehicle, the combination of a car-body, a truck comprising axles and wheels and a frame supported thereby pivotally connected to said car-body, an auxiliary body yieldingly supported on said truck and movable relatively to the truck and car-body, an engine and a speed-varying and reversing mechanism carried by said auxiliary body and means actuated from the car-body for connecting said engine in driving relation to a wheel of the truck and disconnecting it therefrom, substantially as described.

10. In a motor-vehicle, the combination of a car-body, a truck comprising axles and wheels and a frame supported thereon pivotally connected to the car-body, an auxiliary body, springs supporting the same upon the truck and permitting movement thereof independently of the truck and car-body, an engine adapted to be connected in driving relation to a wheel of the truck and a transmission mechanism mounted on said auxiliary body, and means actuated from the car-body for operating the parts of said transmission to control the speed and direction of rotation of the wheel of the truck actuated by said engine, substantially as described.

11. In a motor-vehicle, the combination of a car-body, a truck comprising axles and wheels and a frame supported thereby pivotally connected to the car-body, an engine and a transmission mechanism mounted on the truck, and means for actuating the parts of the transmission mechanism from the car-body to control the connection of the engine-shaft in driving relation to a wheel of the truck, said means comprising a lever system independent of the king-pin of the truck and arranged to be substantially unaffected by the movements of the truck relatively to the car-body about the axis of the pivotal connection between them, substantially as described.

12. In a motor-vehicle, the combination of a car-body, a truck comprising axles and wheels and a frame supported thereby pivotally connected to said car-body, an engine and a transmission mechanism mounted on the truck, and means for actuating the parts of the transmission mechanism from the car-body to control the connection of the engine-shaft to a wheel of the truck comprising a lever system having a joint therein in proximity to the pivotal connection between the truck and car-body, substantially as described.

13. In a motor-vehicle, the combination of a car-body, a truck comprising axles and wheels and a frame supported thereby pivotally connected to the car-body, means for yieldingly supporting the car-body upon the truck, an auxiliary body yieldingly supported upon the truck in a manner permitting vertical movement thereof relatively to the car-body, an engine carried by said auxiliary body, and means for connecting the engine in driving relation to a wheel of the truck, substantially as described.

This specification signed and witnessed this 16th day of January, 1906.

WALTER D. HAWK.

Witnesses:
F. B. CANODE,
WALTER IRVIN.